United States Patent [19]
Wolverton et al.

[11] Patent Number: 5,366,297
[45] Date of Patent: Nov. 22, 1994

[54] BEARING/FLEXIBLE COUPLING FOR ORBITAL MOTION

[75] Inventors: Steven R. Wolverton; Terry L. Kietzman, both of Mooresville, N.C.; Keith E. Meyers, Collegeville, Pa.

[73] Assignee: Ingersoll-Rand Company, Woodcliff Lake, N.J.

[21] Appl. No.: 106,001

[22] Filed: Aug. 13, 1993

[51] Int. Cl.$^5$ .............................................. F16C 29/04
[52] U.S. Cl. ........................................ 384/9; 384/49
[58] Field of Search ................... 384/9, 49, 609, 615, 384/613, 18

[56] References Cited

U.S. PATENT DOCUMENTS 3,903,750   9/1975   Takasu .
4,259,043   3/1981   Hidden et al. .
4,648,723   3/1987   Sugiyama et al. ....................... 384/9
4,715,733  12/1987   Rood .
5,248,203   9/1993   Agari ................................... 384/49

FOREIGN PATENT DOCUMENTS

662983A5  11/1987  Switzerland .

Primary Examiner—Lenard A. Footland
Attorney, Agent, or Firm—Victor M. Genco, Jr.

[57] ABSTRACT

A bearing for orbital motion includes a first plate having first and second surfaces. The second surface has formed thereon a race and a reservoir which circumscribes the race. A second plate has first and second surfaces. The first surface of the second plate has formed thereon a race and a reservoir which are matingly dimensioned and oriented with respect to the race and reservoir of the first plate. The second surface of the second plate has formed thereon a race, which is oriented perpendicular to the race of the first surface, and a reservoir, which circumscribes the race. A third plate has first and second surfaces, and the first surface has formed thereon a race and a reservoir which are matingly dimensioned and oriented with respect to the race and reservoir of the second surface of the second plate. A first pair of load carrying members are disposed in the mating races of the first and the second plates. A second pair of load carrying members are disposed in the mating races of the second and the third plates.

11 Claims, 3 Drawing Sheets

BEARING/FLEXIBLE COUPLING FOR ORBITAL MOTION

BACKGROUND OF THE INVENTION

This invention generally relates to a bearing, and more particularly, to a bearing/flexible coupling component interposed between two opposed surfaces in orbital motion relative to each other.

To date, mechanical-joint type flexible couplings, such as Oldham type couplings or slider-block type couplings, have been employed to mechanically connect shafts that are laterally or angularly out of alignment. These flexible couplings permit some degree of axial movement in one or both shafts. Generally, flexible couplings are subjected to one or more of the following loads: 1) centrifugal force; 2) steady transmitted torque, e.g. smooth non-fluctuating torque as in electric motors or turbines; 3) cyclically transmitted torque, e.g. pulsating or cyclic torque as in reciprocating prime movers; 4) additional cyclic torque caused by machining imperfections of drive components; 5) peak torque, e.g. transients caused by starting conditions and momentary shock; 6) impact torque, which is a function of system looseness or backlash; 7) misalignment loads; 8) sliding velocity; and 9) resonant vibration.

During operation of the Oldham type couplings or the slider-block type couplings, under the various loads described hereinabove, typically, the main cause of failure is wear or surface fatigue caused by lack of lubrication, or excess surface stress. Additionally, Oldham type couplings and slider-block type couplings are generally limited in the amount of thrust loading which they may tolerate under high operating velocities.

The foregoing illustrates limitations known to exist in present flexible couplings. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a bearing/flexible coupling component for orbital motion which includes a first plate which has first and second surfaces, and which has formed on the second surface at least one race. A second plate has first and second surfaces, and the first surface has formed thereon at least one race dimensioned and oriented to mate with the at least one race of the first plate. The second surface of the second plate has formed thereon at least one race which is oriented perpendicular to the at least one race of the first surface. A third plate has first and second surfaces, and the first surface has formed thereon at least one race which is dimensioned and oriented to mate with the at least one race of the second surface of the second plate. A first pair of load carrying members are rollingly disposed in the mating races of the first and the second plates. A second pair of load carrying members are rollingly disposed in the mating races of the second and the third plates.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
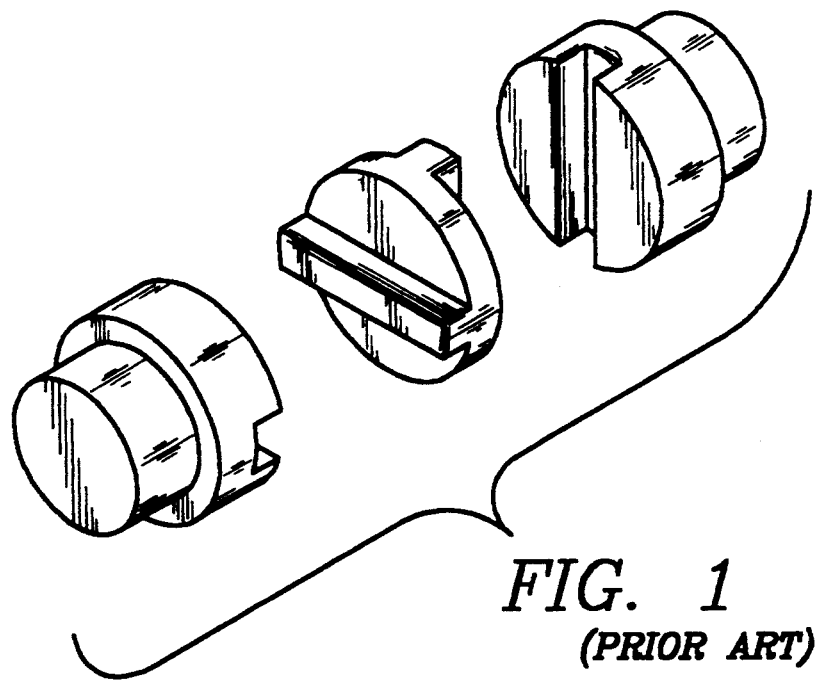
FIG. 1 is a perspective view of a prior art Oldham type coupling.
Figure 2:
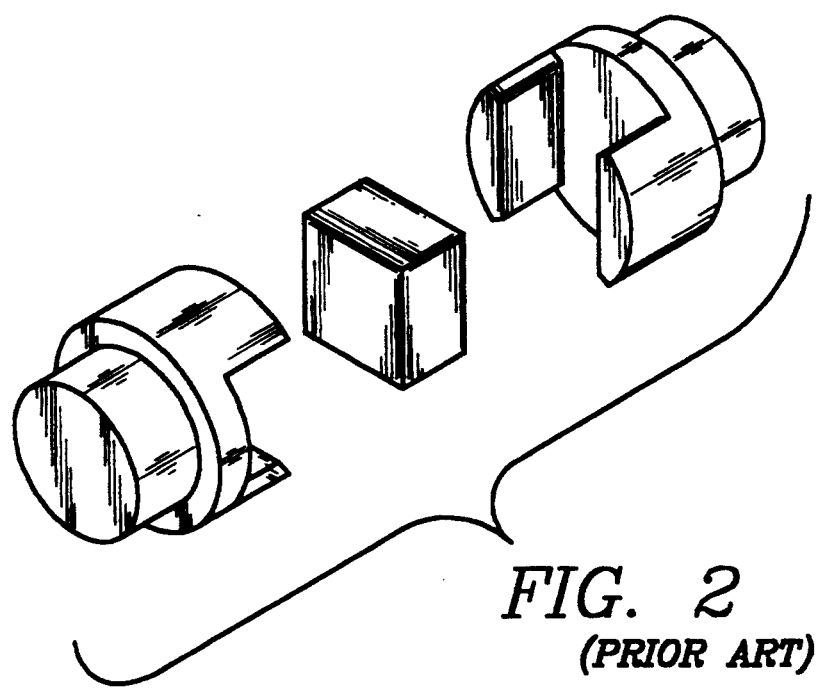
FIG. 2 is a perspective view of a prior art slider-block type coupling.
Figure 3:
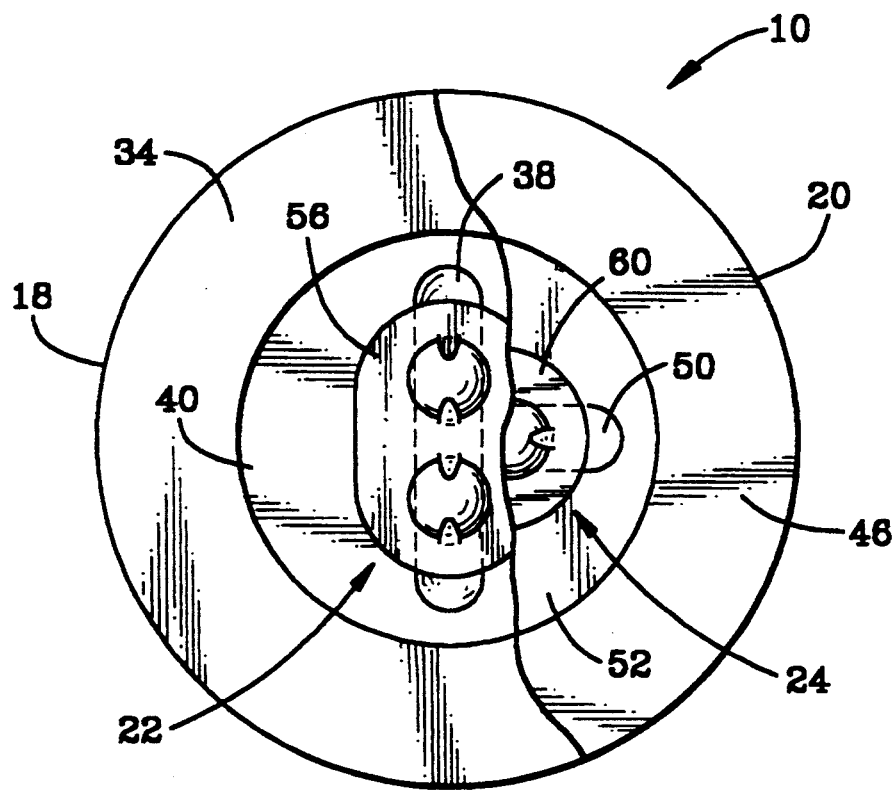
FIG. 3 is a partial, cut-away view of the apparatus of the present invention.
Figure 4:
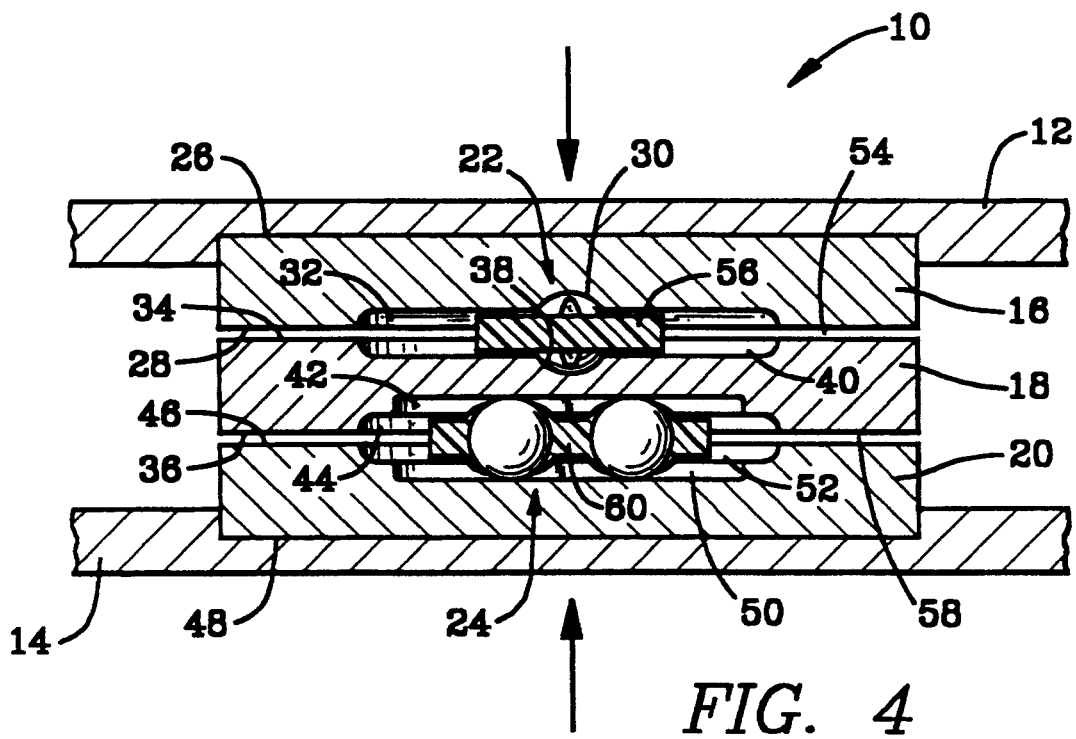
FIG. 4 is a partial, sectional view of the apparatus of FIG. 3, and wherein the apparatus is mounted between a moveable object of interest and a stationary object of interest.
Figure 5:
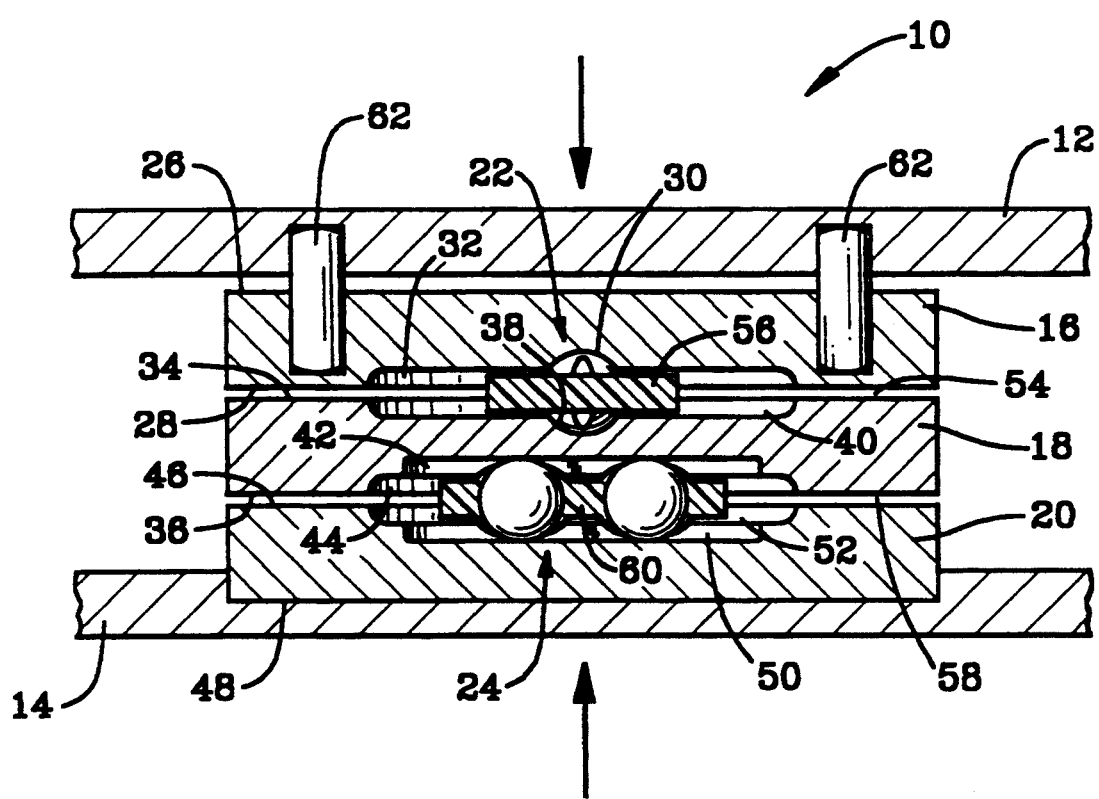
FIG. 5 is a view similar to FIG. 4 illustrating an alternative means for mounting the apparatus between the moveable object of interest and the stationary object of interest.

Referring more particularly to the drawings, the apparatus of the subject invention is generally indicated at numeral 10 in FIGS. 3, 4 and 5. As showed therein, the apparatus 10 functions as a bearing/flexible coupling for use between two objects in relative orbital motion, such as a moveable object of interest 12, and a stationary object of interest 14. Additionally, the apparatus 10 may be mounted for operation between a first moveable object of interest and a second moveable object of interest (not shown). The apparatus 10 of the present invention has particular utility when interposed between an orbiting scroll driven by an eccentric driver and a stationary scroll of a scroll compressor (not shown). FIG. 5 illustrates an alternate means for mounting the apparatus 10 between the moveable object of interest 12 and the stationary object of interest 14. FIGS. 1 and 2 illustrate prior art mechanical-joint type flexible couplings, such as the Oldham type coupling illustrated by FIG. 1, and the slider-block type coupling which is illustrated by FIG. 2. Similar elements in the Figures are numbered similarly.

The apparatus 10 includes a first plate 16, a second plate 18, a third plate 20, a first pair of load carrying members 22, and a second pair of load carrying members 24.

The first plate 16 includes opposing first and second planar surfaces 26 and 28, respectively. The second surface 28 has formed thereon at least one race 30 which is defined by a predetermined depth dimension. As illustrated by FIGS. 4 and 5, a preferred embodiment of the apparatus 10 includes a reservoir 32 which circumscribes the race 30. The reservoir is defined by a depth dimension which is less than the depth dimension of the race 30.

The second plate 18 is disposed generally parallel to the first plate 16. The second plate 18 includes opposing first and second planar surfaces 34 and 36, respectively. The first surface 34 has formed thereon at least one race 38 which is matingly dimensioned and oriented with respect to the race 30. In the preferred embodiment of the apparatus 10, a reservoir 40 circumscribes the race 38. The reservoir 40 is matingly dimensioned and oriented with respect to the reservoir 32 of the first plate 16. The second surface 36 has formed thereon at least one race 42, which is oriented perpendicular to the race 38 of the first surface 34. The race 42 is defined by a predetermined depth dimension. The preferred embodiment of the apparatus 10 includes a reservoir 44 which circumscribes the race 42. The reservoir 44 is defined by a depth dimension which is less than the depth dimension of the race 42.

The third plate 20 is disposed generally parallel to the second plate 18. The third plate 20 includes opposing first and second planar surfaces 46 and 48, respectively. The first surface 46 has formed thereon at least one race 50 which is matingly dimensioned and oriented with respect to the race 42 of the second surface 36 of the second plate 18. In the preferred embodiment of the apparatus 10, a reservoir 52 circumscribes the race 50. The reservoir 52 is matingly dimensioned and oriented with respect to the reservoir 44 of the second surface 36 of the second plate 18.

In the preferred embodiment, the first pair of load carrying members 22 are generally spherically shaped, such as a pair of ball bearings. The first pair of load carrying members 22 are rollingly disposed in the mating races 30,38 of the first and the second plates 16,18, respectively. The spherical load carrying members 22 are dimensioned to place the first and second plates in a parallel spaced apart relation, one to each other. The general operational placement of the first plate 16 with respect to the second plate 18 is best illustrated by FIGS. 4 and 5. As illustrated therein, a parallel gap region 54 is defined between the second surface 28 of the first plate and the first surface 34 of the second plate. A first cage 56 may carry the first pair of load carrying rolling members 22 in fixed relation, one to each other.

In the preferred embodiment, the second pair of load carrying members 24 are generally spherically shaped, such as a pair of ball bearings. The second pair of load carrying members 24 are rollingly disposed in the mating races 42,50 of the second and the third plates 18,20, respectively. The spherical load carrying members 24 are dimensioned to place the second and third plates in a parallel spaced apart relation, one to each other. The general operational placement of the second plate 18 with respect to the third plate 20 is best illustrated by FIGS. 4 and 5. As illustrated therein, a parallel gap region 58 is defined between the second surface 36 of the second plate and the first surface 46 of the third plate. A second cage 60 may carry the second pair of load carrying rolling members 24 in fixed relation, one to each other.

As described hereinabove, the first plate 16 of the apparatus 10 is mounted for operation on the moveable object of interest 12. In this regard, and as illustrated in FIG. 4, the first plate 16 may be "press fit" on the moveable object of interest 12. Alternatively, the first plate may be mounted on the moveable object of interest 12 by way of a predetermined number of connecting or mounting pins 62, as illustrated in FIG. 5. The mounting method of FIG. 5 is particularly useful in such situations where it is desirable to achieve a flow of cooling fluid, such as air, between the moveable object of interest and the first plate 16. In both FIGS. 4 and 5, the third plate 20 is "press fit" on the stationary object of interest 14. Although FIGS. 4 and 5 illustrate two methods of mounting the apparatus 10 for operation, it will be appreciated by one skilled in the art that any suitable method of mounting the apparatus 10 for operation may be suitably employed.

Each of the reservoirs of the apparatus 10, namely reservoirs 32, 40, 44 and 52, locate a respective, predetermined volume of lubricant (not shown) having a predetermined viscosity. In this regard, the viscosity of the lubricant is such that during operation of the apparatus 10, each parallel gap region 54,58 shields lubricant flow within a respective parallel gap region.

In operation, opposing thrust loads, which are illustrated by the arrows in FIGS. 4 and 5, are applied to the apparatus 10 through the first plate 16 and the third plate 20. The opposing thrust loads movably lock the first, second and thirds plates to permit operation of the apparatus 10, during which the first plate 16 achieves relative orbital motion with respect to the third plate 20. The relative orbital motion is achieved by the apparatus 10 by the directed movement of the individual plates as permitted by action of the first and second pair of rolling members within the mating races, 30,38, and 42,50, respectively.

While this invention has been illustrated and described in accordance with a preferred embodiment, it is recognized that variations and changes may be made therein without departing from the invention as set forth in the following claims.

Having described the invention, what is claimed is:

1. An antifriction apparatus comprising:
    a first plate having first and second surfaces, the second surface having formed thereon at least one race;
    a second plate having first and second surfaces, the first surface having formed thereon at least one race dimensioned and oriented to mate with the at least one race of the first plate, the second surface having formed thereon at least one race oriented perpendicular to the at least one race of the first surface;
    a third plate having first and second surfaces, the first surface having formed thereon at least one race dimensioned and oriented to mate with the at least one race of the second surface of the second plate;
    a first pair of load carrying members rollingly disposed in the mating races of the first and the second plates; and
    a second pair of load carrying members rollingly disposed in the mating races of the second and the third plates.

2. An antifriction apparatus, as claimed in claim 1, and wherein the first and the second pair of load carrying members are spherical bearings.

3. An antifriction apparatus, as claimed in claim 2, and wherein the first and the second pair of spherical bearings are dimensioned to place the first and second plates, and the second and the third plates, in parallel spaced apart relation.

4. An antifriction apparatus, as claimed in claim 1, including a first cage means for carrying the first pair of load carrying members.

5. An antifriction apparatus, as claimed in claim 1, including a second cage means for carrying the second pair of load carrying members.

6. An antifriction apparatus, as claimed in claim 1, and wherein the first plate is fixedly attached to a moveable object of interest.

7. An antifriction apparatus, as claimed in claim 6, and wherein the moveable object of interest is an orbiting scroll of a scroll compressor.

8. An antifriction apparatus, as claimed in claim 6, and wherein the first plate is fixedly attached to the moveable object of interest by way of a pair of pins which place the first surface of the first plate in parallel spaced apart relation with respect to the movable object of interest.

9. An antifriction apparatus, as claimed in claim 1, and wherein the third plate is fixedly attached to a stationary object of interest.

10. An antifriction apparatus, as claimed in claim 9, and wherein the stationary object of interest is a stationary scroll of a scroll compressor.

11. An antifriction apparatus, as claimed in claim 1, and wherein the first plate achieves relative orbital motion with respect to the third plate, during operation thereof.

* * * * *